(12) United States Patent
Nakamura et al.

(10) Patent No.: US 8,218,094 B2
(45) Date of Patent: Jul. 10, 2012

(54) TELEVISION APPARATUS AND ELECTRONIC APPARATUS

(75) Inventors: Kazuhiro Nakamura, Hachioji (JP); Toshikatsu Nakamura, Akishima (JP); Daisuke Maehara, Ome (JP); Kohei Wada, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/082,252

(22) Filed: Apr. 7, 2011

(65) Prior Publication Data

US 2011/0310311 A1    Dec. 22, 2011

(30) Foreign Application Priority Data

Jun. 18, 2010  (JP) ................................ 2010-139794

(51) Int. Cl.
*H04N 5/64*  (2006.01)
*H04N 5/70*  (2006.01)

(52) U.S. Cl. ........ 348/801; 348/794; 348/836; 348/789; 348/787

(58) Field of Classification Search .................. 348/801, 348/794, 825, 836, 832, 789, 787, 756; 362/612, 362/800, 632, 555, 545, 11; 257/99, 88
See application file for complete search history.

(56) References Cited

U.S. PATENT DOCUMENTS

| 5,083,192 A | 1/1992 | Rzeznik et al. |
| 7,401,512 B2 * | 7/2008 | Kalix et al. .................... 73/293 |

FOREIGN PATENT DOCUMENTS

| JP | 05-29164 | 4/1993 |
| JP | 2002-162550 | 7/2002 |
| JP | 2003234507 | 8/2003 |
| JP | 2004-200120 | 7/2004 |
| JP | 2006-064811 | 9/2006 |
| JP | 2007-171636 | 5/2007 |
| JP | 2008-084990 | 4/2008 |
| JP | 2008-258094 | 10/2008 |

OTHER PUBLICATIONS

Japanese Patent Application No. 2011-155960, Notice of Reasons for Rejection, mailed Sep. 20, 2011, (with English Translation).

* cited by examiner

*Primary Examiner* — Jefferey Harold
*Assistant Examiner* — Jean W Desir
(74) *Attorney, Agent, or Firm* — Blakely, Sokoloff, Taylor & Zafman LLP

(57) ABSTRACT

According to one embodiment, a television apparatus includes, a printed wiring board provided with a cutout portion, a plurality of first light emitting diodes provided on the printed wiring board and configured to emit light parallel to the printed wiring board, and a lens. The lens includes a plurality of light receiving parts fitted in the cutout portion in such a manner as to correspond to the first light emitting diodes, respectively, and a display part configured to display the light which has entered through the light receiving parts.

15 Claims, 10 Drawing Sheets

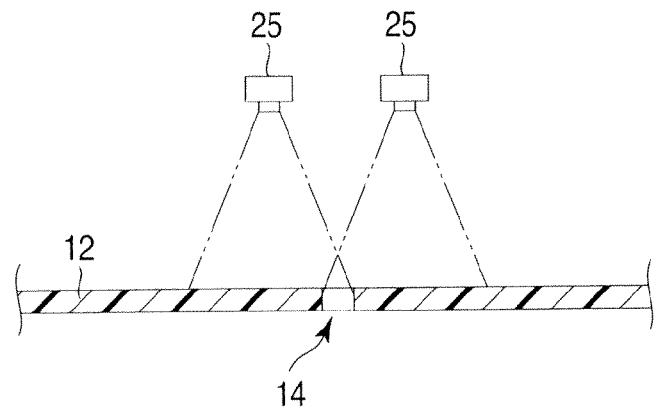
F I G. 6
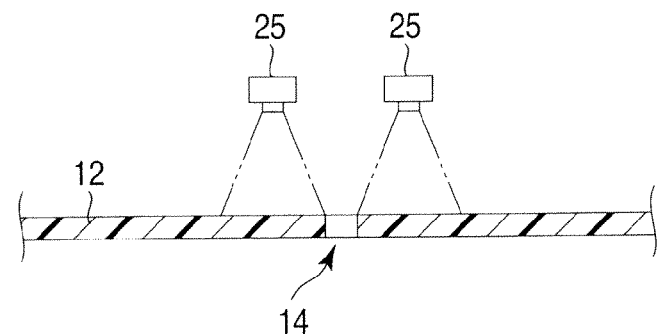
F I G. 7
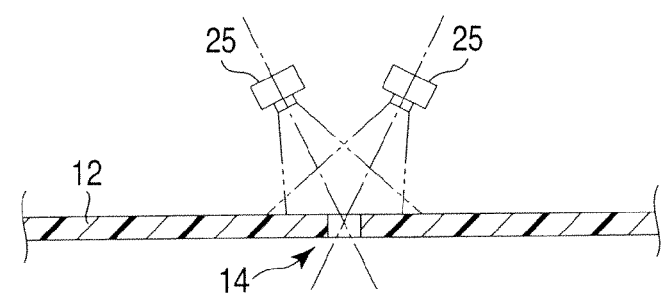
F I G. 8

TELEVISION APPARATUS AND ELECTRONIC APPARATUS

CROSS-REFERENCE TO RELATED APPLICATIONS

This application is based upon and claims the benefit of priority from Japanese Patent Application No. 2010-139794, filed Jun. 18, 2010; the entire contents of which are incorporated herein by reference.

FIELD

Embodiments described herein relate generally to a television apparatus and electronic apparatus comprising a light emitting diode.

BACKGROUND

In an electronic apparatus such as a television, an operation part such as a button is often illuminated by a light such as a light emitting diode (LED). Such a light is provided in correspondence with, for example, a transparent button, and is configured to illuminate the entire button or part of the button. Recently, multiple types of LEDs, which emit light of different colors, have been on the market.

An LED (light) is also often used to display the state of an electronic apparatus. For example, a first light is on while the power is on, a second light is on while a hard disk is being accessed, a third light is on while wireless communication is being performed, and a fourth light is on while, for example, an optical disk drive is being driven. In this way, it is convenient for users to display states of an electronic apparatus using a light or the like. On the other hand, provision of too many lights is contrary to a demand for reduction in size of an electronic apparatus and for space saving within a case, and it is difficult to achieve the balance between the convenience and the demand.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 6 is an exemplary schematic view showing a first reference example of arrangement of first light emitting diodes.

FIG. 7 is an exemplary schematic view showing a second reference example of arrangement of the first light emitting diodes.

FIG. 8 is an exemplary schematic view showing arrangement of the first light emitting diodes of a first embodiment.

DETAILED DESCRIPTION

Various embodiments will be described hereinafter with reference to the accompanying drawings.

In general, according to one embodiment, a television apparatus includes, a printed wiring board provided with a cutout portion, a plurality of first light emitting diodes provided on the printed wiring board and configured to emit light parallel to the printed wiring board, and a lens. The lens includes a plurality of light receiving parts fitted in the cutout portion in such a manner as to correspond to the first light emitting diodes, respectively, and a display part configured to display the light which has entered through the light receiving parts.

Figure 1:
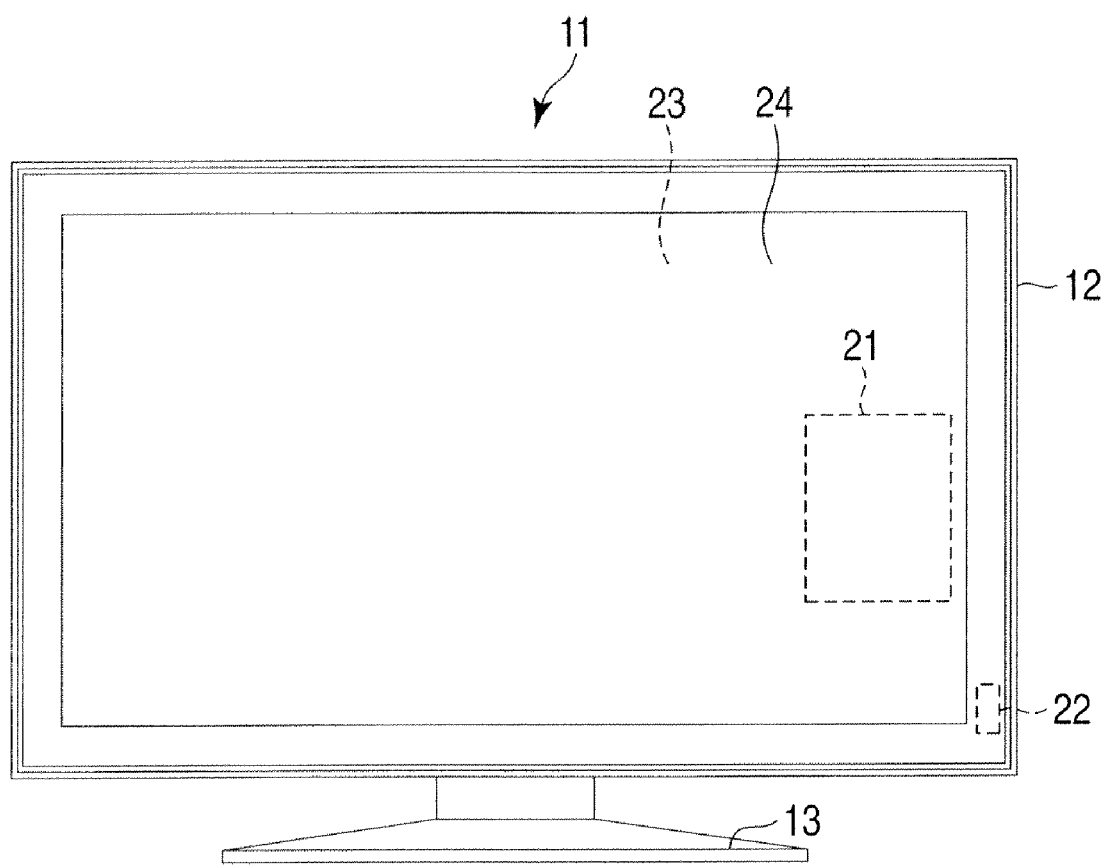
FIG. 1 is an exemplary elevational view showing a television apparatus, which is an example of an electronic apparatus of a first embodiment.
Figure 2:
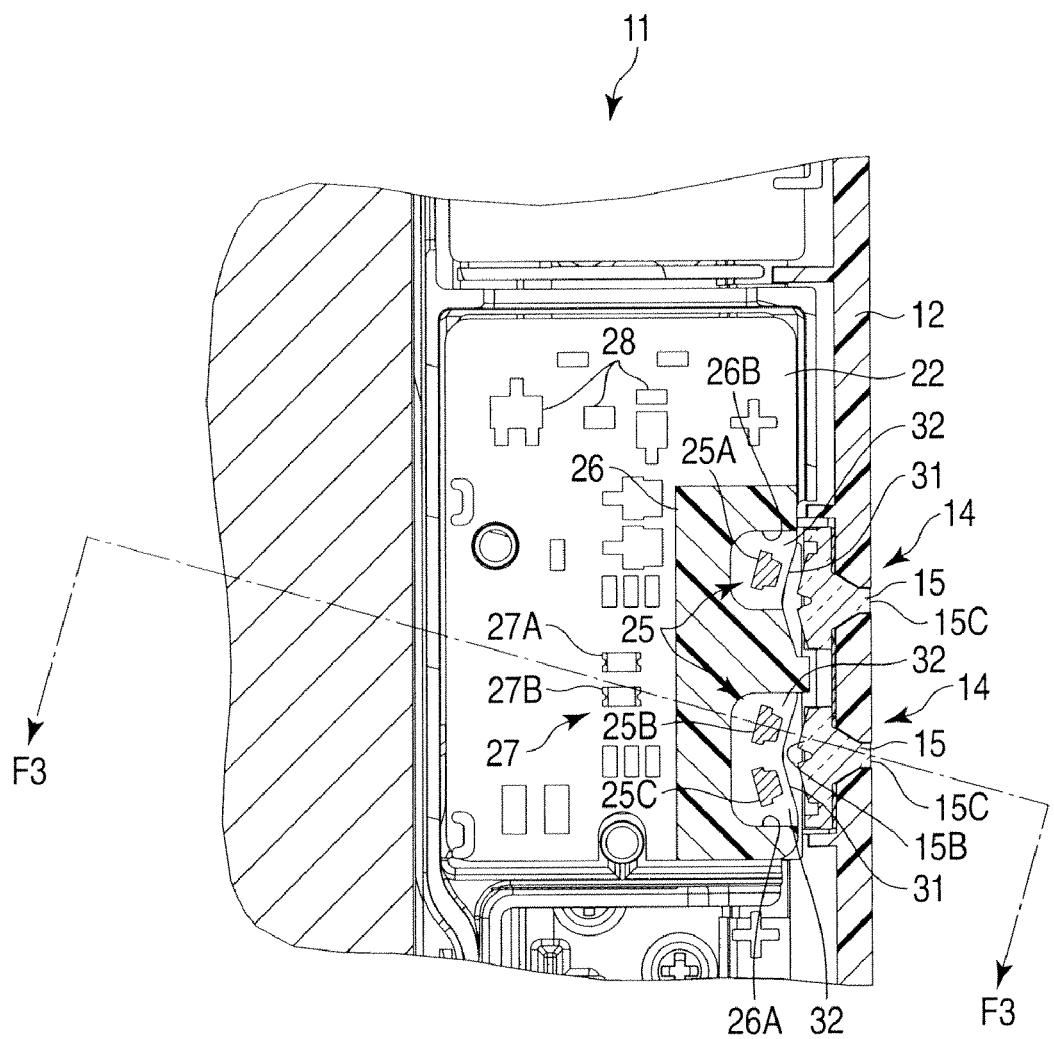
FIG. 2 is an exemplary enlarged sectional view of the vicinity of a printed wiring board of the television apparatus shown in FIG. 1.

Referring to FIGS. 1-8, a first embodiment of an electronic apparatus will be described below. As shown in FIG. 1, a television apparatus 11, which is an example of the electronic apparatus of the present embodiment, is a slim display apparatus having a rectangular appearance. The television apparatus 11 comprises a housing 12 and a leg part 13 supporting the housing 12. As shown in FIG. 2, the housing 12 is provided with a pair of opening portions 14. The television apparatus 11 comprises a pair of lenses 15 fitted in the opening portions 14, respectively.

As shown in FIGS. 1 and 2, the television apparatus 11 comprises in the housing 12: a tuner substrate; a system substrate 21 which collectively controls parts of the television apparatus 11; a printed wiring board 22 electrically connected to the system substrate 21 via, for example, a flexible cable; and a flat-shaped display 23. The display 23 is formed of, for example, a liquid crystal display panel, but may be formed of another type of display panel, such as a plasma display panel.

Figure 3:
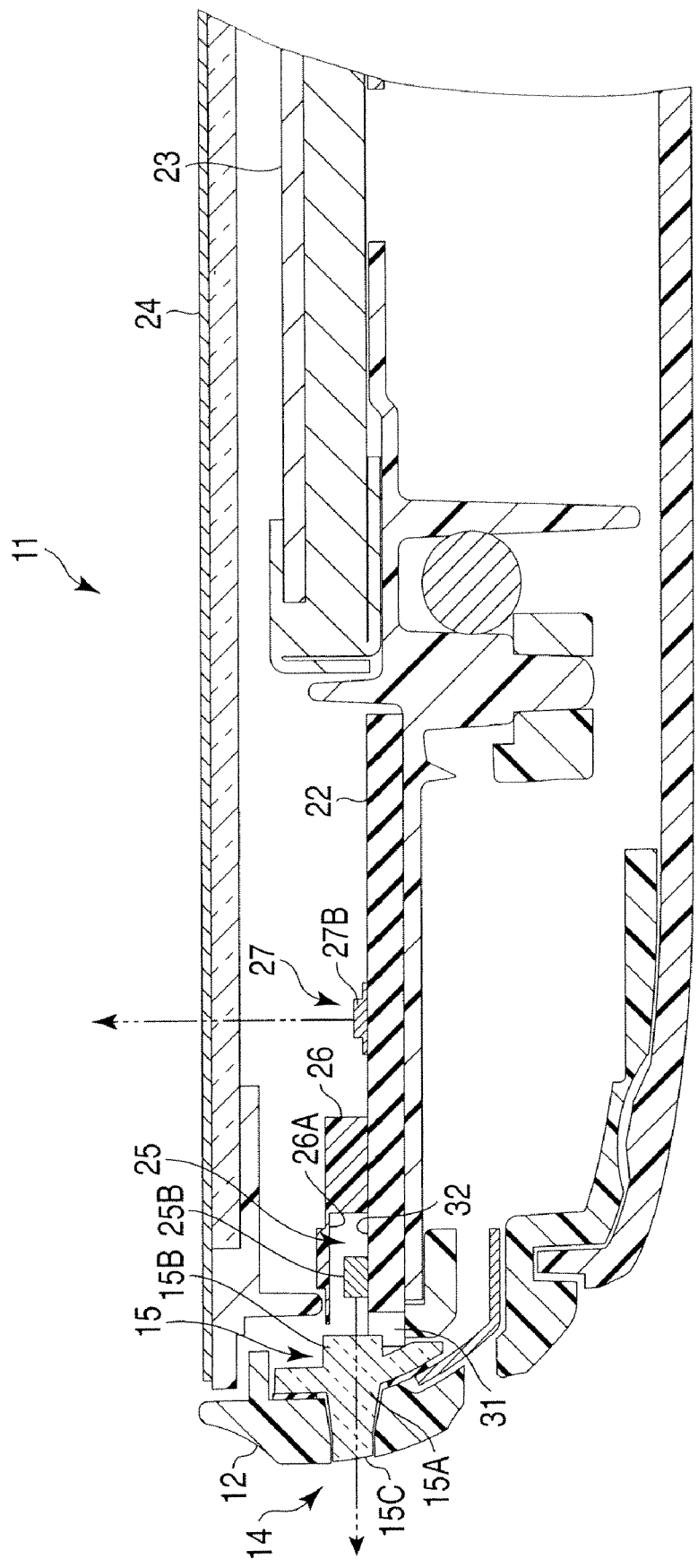
FIG. 3 is an exemplary sectional view of the television apparatus shown in FIG. 2, taken along line F3-F3.

As shown in FIGS. 2 and 3, the television apparatus 11 comprises: a plate-like transparent cover 24 covering the surface of the display 23; a plurality of first light emitting diodes 25 provided on the printed wiring board 22; a shade 26 surrounding the first light emitting diodes 25; and a plurality of second light emitting diodes 27 provided on the printed wiring board 22 at positions separated from the first light emitting diodes 25.

In addition to the first light emitting diodes 25 and second light emitting diodes 27, a plurality of circuit components 28 are mounted on the printed wiring board 22 at high density. The printed wiring board 22 is provided with an approximately triangular cutout portion 31 formed along the outer shape of light receiving parts 15B of each of the lenses 15, and an edge portion 32 defining the periphery of the cutout portion 31.

The first light emitting diodes 25 are aligned on the edge portion 32 of the printed wiring board 22. In the present embodiment, three first light emitting diodes 25 are provided on the printed wiring board 22, but the number is not limited to three. First light emitting diode 25A of the first light emitting diodes 25, which is the upper one in FIG. 2, emits, for example, orange light while, for example, a wireless LAN is operating, thereby notifying a user of the operation. First light emitting diode 25B of the first light emitting diodes 25, which is the middle one in FIG. 2, emits, for example, green light while, for example, a contained optical disk drive is operating, thereby notifying the user of the operation. First light emitting diode 25C of the first light emitting diodes 25, which is the lower one in FIG. 2, emits, for example, red light while, for example, a contained hard disk drive is being driven, thereby notifying the user of the operation.

As shown in FIG. 2, each of the first light emitting diodes 25 is provided on an imaginary straight line connecting a display part 15C and a light receiving part 15B of the lens 15, which will be described later. Each of the first light emitting diodes 25 is oriented and opposed to the display part 15C of the lens 15. In other words, each of the first light emitting diodes 25 is provided to emit light to the display part 15C. The first light emitting diode 25 is a side-lighting-type light emitting diode, which is configured to emit light parallel to the printed wiring board 22.

As shown in FIGS. 2 and 3, the shade 26 is provided on the printed wiring board 22, and covers the side and top surfaces of the first light emitting diodes 25 at positions other than the pair of lenses 15. The shade 26 is provided with a first containing portion 26A which is a concave formed for containing therein two of the first light emitting diodes 25, and a second containing portion 26B which is a concave formed for containing therein one of the first light emitting diodes 25. The shade 26 separates the first light emitting diodes 25 from the second light emitting diodes 27, and prevents, for example, light emitted from the second light emitting diodes 27 from being applied to the lenses 15 opposed to the first light emitting diodes 25.

The second light emitting diodes 27 are located on the printed wiring board 22 away from the edge portion 32, i.e., on an approximately center portion of the printed wiring board 22. In the present embodiment, two second light emitting diodes 27 are provided on the printed wiring board 22, but the number is not limited to two. Each of the second light emitting diodes 27 is an upward-lighting-type diode, and is configured to emit light in a direction crossing (orthogonal to) a direction in which the printed wiring board 22 extends. Second light emitting diode 27A of the second light emitting diodes 27 emits light, for example, through the cover 24, and notifies the user of the power-on state. Second light emitting diode 27B of the second light emitting diodes 27 emits light, for example, through the cover 24, and notifies the user that the television apparatus 11 is in a power-saving mode, for example.

Figure 4:
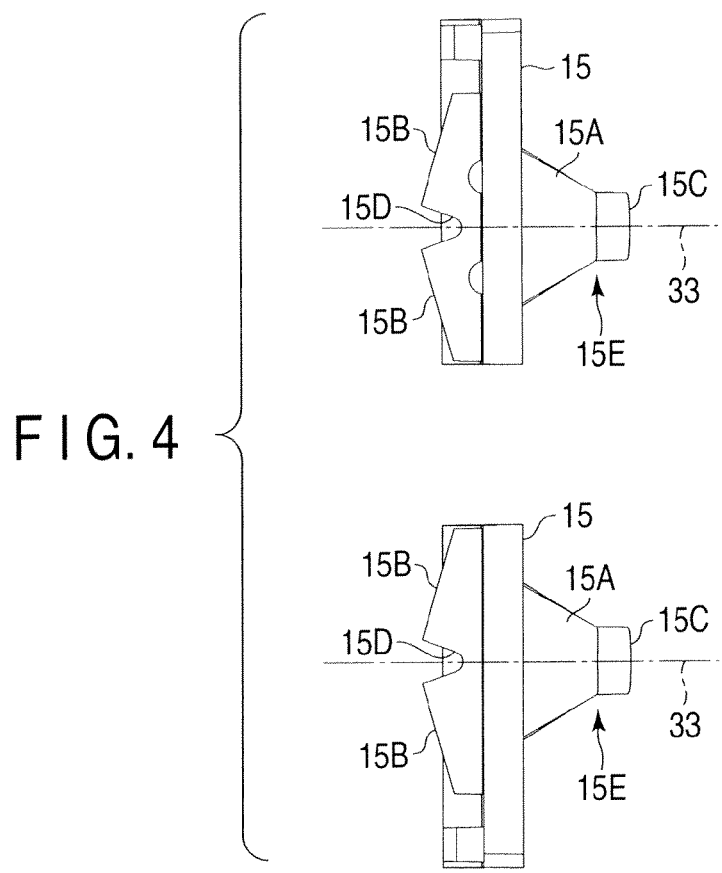
FIG. 4 is an exemplary top view of a lens of the television apparatus shown in FIG. 3.

As shown in FIGS. 2 and 4, each of the lenses 15 comprises: a main part 15A shaped like a truncated cone; a plurality of light receiving parts 15B protruding from the lower base portion of the main part 15A to the first light emitting diodes 25; a display part 15C provided on the upper base portion of the main part 15A; and a wedge-shaped recess 15D provided between the light receiving parts 15B. Further, the main part 15A and display part 15C form a light guide part 15S for guiding light which has entered through the light receiving parts 15B to the surface of the display part 15C. The main part 15A, light receiving parts 15B and display part 15C are integrally formed of a transparent material, such as an acrylic resin. The main part 15A is fitted in the opening portion 14 of the housing 12.

Figure 5:
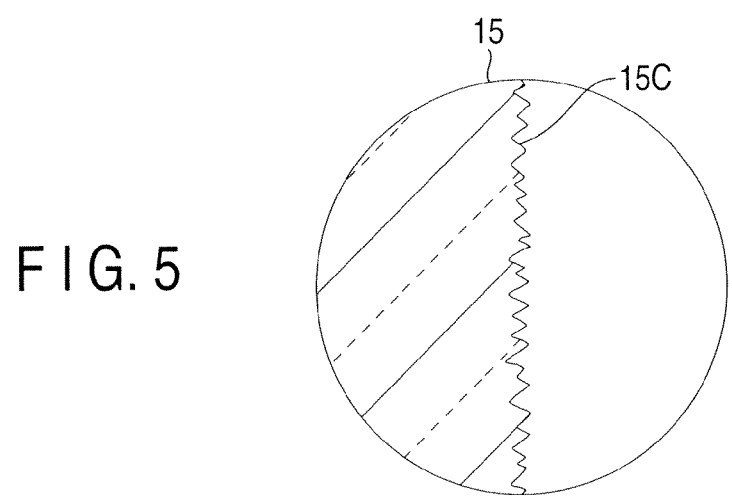
FIG. 5 is an exemplary enlarged plan view of part of a display unit of the lens shown in FIG. 4.

As shown in FIG. 4, the lens 15 is symmetrical (right-left symmetrical) with respect to a central axis 33 of the main part 15A. In the present embodiment, the lens 15 is provided with two light receiving parts 15B. As shown in FIG. 2, the light receiving parts 15B are fitted in the cutout portion 31 of the printed wiring board 22 in such a manner as to correspond to the first light emitting diodes 25, respectively. The display part 15C displays light from the first light emitting diode 25, which has entered through the light receiving parts 15B. As schematically shown in FIG. 5, the display part 15C has a surface processed (subjected to texturing) to increase surface roughness, and can diffuse light at the surface.

Light from first light emitting diode 25A is displayed by the display part 15C of the upper lens 15 in FIG. 2, and light from first light emitting diodes 25B, 25C is displayed by the display part 15C of the lower lens 15 in FIG. 2. Since first light emitting diode 25A is provided at the same angle relative to the lens 15 as first light emitting diodes 25B, 25C, the amount of light of first light emitting diode 25A is adjusted to fall within an appropriate range. With this configuration, first light emitting diode 25A is adjusted to look the same as first light emitting diodes 25B, 25C, thereby preventing the user from feeling a sense of strangeness.

In the first embodiment, the television apparatus 11 comprises: a printed wiring board 22 provided with a cutout portion 31; a plurality of first Light emitting diodes 25 provided on the printed wiring board 22 and configured to emit light parallel to the printed wiring board 22; and a lens 15 comprising a plurality of light receiving parts 15B fitted in the cutout portion 31 in such a manner as to correspond to the first light emitting diodes 25, respectively, and a display part 15C displaying light which has entered through the light receiving parts 15B.

With this configuration, light of the plurality of first light emitting diodes 25 can be displayed by one lens 15, and the number of lenses 15 can be reduced. Consequently, the space occupied by the lens 15 in the television apparatus 11 can be reduced, and the size of the television apparatus 11 can be reduced. In addition, since the light receiving portions 15B are fitted in the cutout portion 31, the distance between the first light emitting diodes 25 and the lens 15 can be reduced to the utmost, and light from the first light emitting diodes 25 can be prevented from leaking outside. Further, since the cutout portion 31 is provided, the lens 15 is prevented from coming into contact with the printed wiring board 22, and a situation in which the television apparatus 11 cannot be properly assembled is prevented.

The printed wiring board 22 comprises an edge portion 32 defining the periphery of the cutout portion 31, and each of the first light emitting diodes 25 is provided on the edge portion 32. With this configuration, the first light emitting diode 25 can be located in the vicinity of the lens 15. Therefore, illumination efficiency can be improved, and leakage of light to the surroundings can be suppressed. Moreover, by providing the first light emitting diode 25 on the edge portion 32, a wide mount area can be secured on the printed wiring board 22.

The television apparatus 11 is provided with an opening portion 14, and comprises a housing 12 in which the printed wiring board 22 and the first light emitting diodes 25 are contained; the lens 15 comprises a main part 15A shaped like a truncated cone such that a lower base portion is continuous with the light receiving parts 15B, and an upper base portion is provided with the display part 15C, the main part 15A being fitted in the opening portion 14; and each of the first light emitting diodes 25 is provided on an imaginary straight line connecting the display part 15C and a corresponding one of the light receiving parts 15B, and is located to emit light to the display part 15C.

For example, as schematically shown in FIG. 6, when the first light emitting diodes 25 are located far from the housing 12, the a sufficient distance between the housing 12 and the first light emitting diodes 25 is secured, and light from two first light emitting diodes 25 are emitted to the outside of the housing 12 through the opening portion 14 as indicated by chain double-dashed lines. However, as shown in FIG. 7, as a result of promotion of size reduction of the housing 12, when a sufficient distance between the housing 12 and the first light emitting diodes 25 cannot be secured, light from the first light emitting diodes 25 does not pass through the opening portion 14 and is blocked by the housing 12 as indicated by chain double-dashed lines. With the above-described configuration, for example, the situation shown in FIG. 8 is made, and even when a sufficient distance between the housing 12 and the first light emitting diodes 25 cannot be secured, sufficient light can be emitted to the display part 15C. Consequently, better viewability of light on the display part 15C and reduction in size of the housing 12 of the television apparatus 11 can be realized.

The lens 15 is almost symmetrical with respect to the central axis 33 of the main part 15A. With this configuration, the light receiving parts 15B are located at the same distance from the display part 15C, and at the same angle with respect to the display part 15C. Therefore, light from all the first light emitting diodes 25 looks the same on the display part 15C.

The television apparatus 11 is provided with a shade 26 provided on the printed wiring board 22 and surrounding the first light emitting diodes 25 at positions other than the lens 15. With this configuration, light from the first light emitting diodes 25 is not diffused to the surroundings, and illumination efficiency can be improved.

The television apparatus 11 is provided on the printed wiring board 22 away from the edge portion 32, and comprises a second light emitting diode 27 configured to emit light in a direction crossing the printed wiring board 22. With this configuration, high-density mounting can be realized on the printed wiring board 22 by providing the first light emitting diodes 25 and the second light emitting diode 27 in different places, e.g., providing the first light emitting diodes 25 on the edge portion 32 and providing the second light emitting diode 27 at a position away from the edge portion 32 on the printed wiring board 22.

Next, referring to FIGS. 9-14, a second embodiment of the electronic apparatus will be explained. A portable computer 41, which is an example of the electronic apparatus of the second embodiment, is different from the television apparatus 11 of the first embodiment in terms of the appearance. However, most main structures are common to those of the first embodiment. Therefore, different elements will be mainly explained. The same elements will be assigned the same reference symbols, and the explanations thereof will be omitted.

In this embodiment, the near side to the user (that is, user side) is defined as the front F, the far side from the user is the rear R, the left-hand side of the user is the left, the right-hand side of the user is the right, the upper side from the user's position is up and the lower side from the user's position is down.

Figure 9:
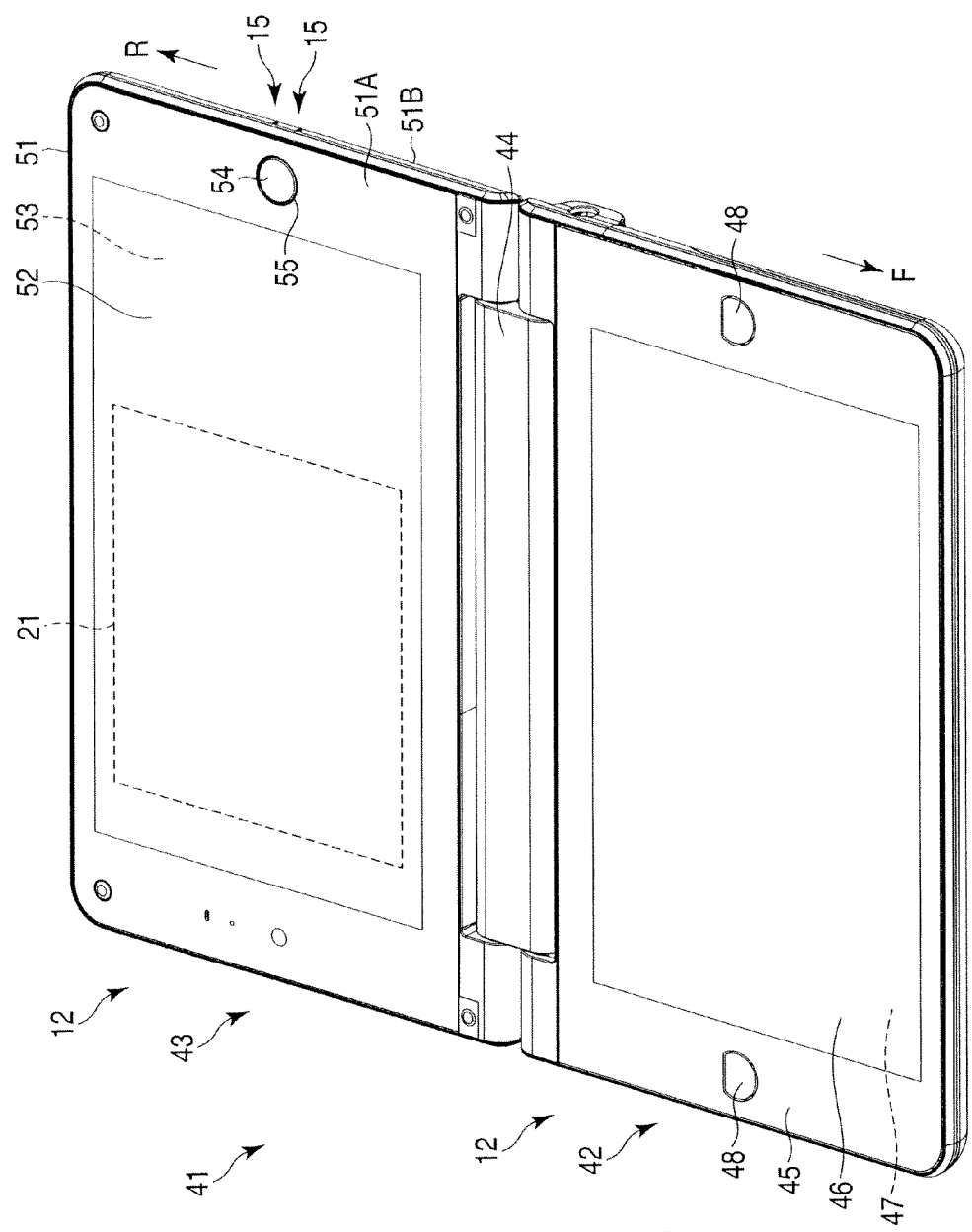
FIG. 9 is an exemplary perspective view showing a portable computer, which is an example of an electronic apparatus of a second embodiment.

As shown in FIG. 9, the portable computer 41 comprises a first unit 42 corresponding to the front F in FIG. 9, a second unit 43 corresponding to the rear R in FIG. 9, and a hinge unit 44 located between the first unit 42 and the second unit 43 and rotatably connecting the first unit 42 and the second unit 43.

The first unit 42 comprises a first case 45, a first touch panel 46 attached to the first case 45, and a first display 47 provided in the first case 45 below the first touch panel 46. The first display 47 is, for example, a liquid crystal display, and is provided adjacent to the first touch panel 46. The first unit 42 comprises a pair of operation buttons 48 between which the first touch panel 46 is located.

As shown in FIG. 9, the second unit 43 comprises a second case 51, a second touch panel 52 attached to the second case 51, a second display 53 provided in the second case 51 below the second touch panel 52, and a power button 54 provided adjacent to the second touch panel 52. The power button 54 is fitted in a through hole 55 provided in the second case 51. The housing 12 comprises the first case 45 and the second case 51.

Figure 10:
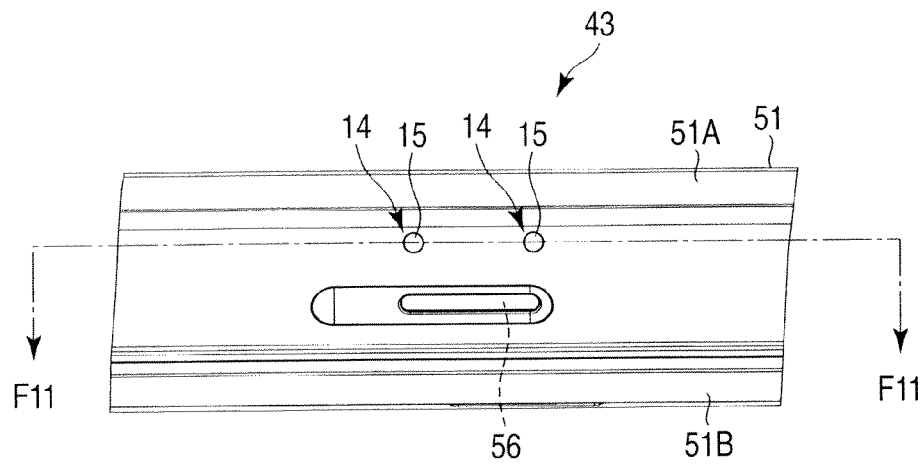
FIG. 10 is an exemplary enlarged side view of the vicinity of lenses of the portable computer shown in FIG. 9.
Figure 13:
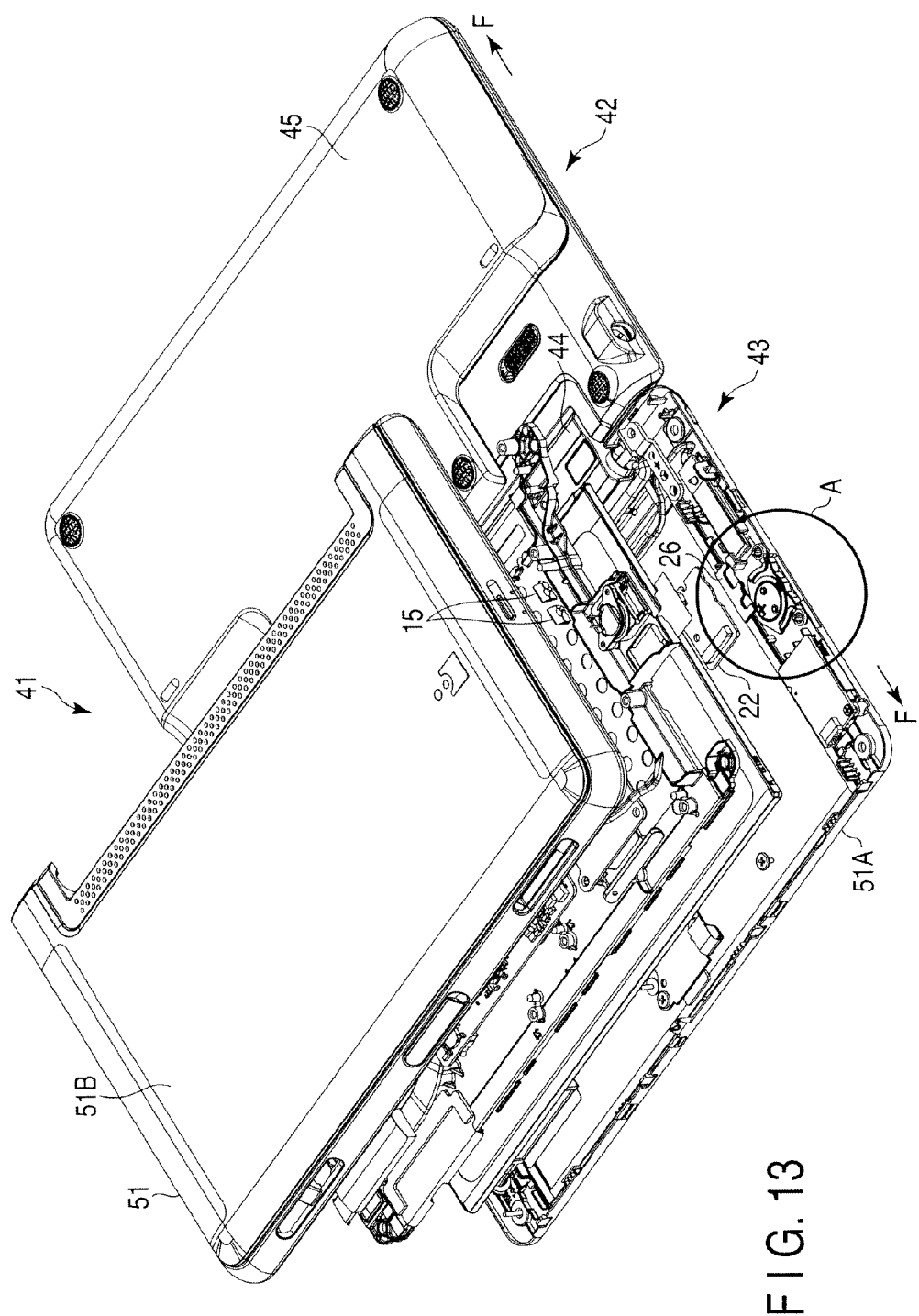
FIG. 13 is an exemplary exploded perspective view of a second unit of the portable computer shown in FIG. 9.
Figure 14:
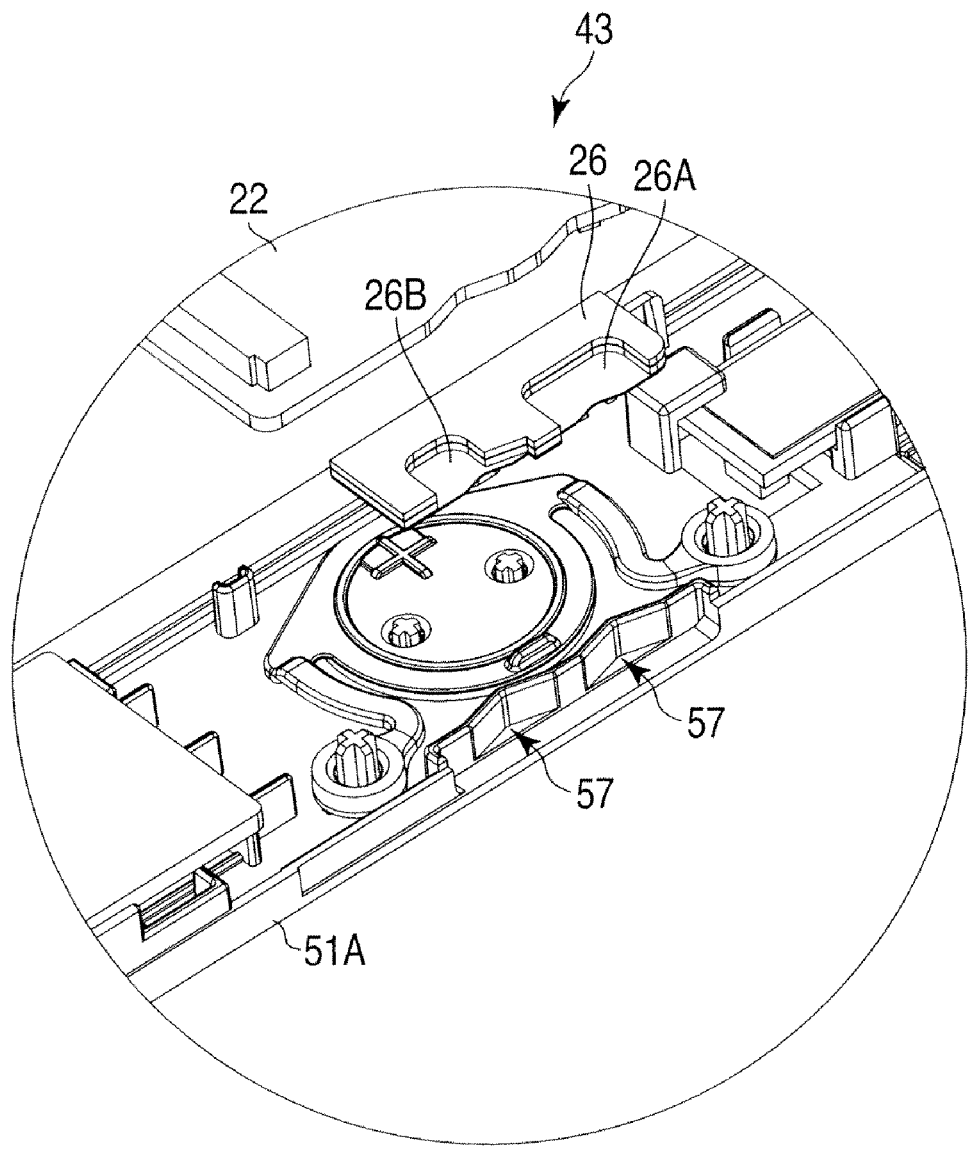
FIG. 14 is an exemplary enlarge perspective view of portion A of the portable computer shown in FIG. 13.

As shown in FIGS. 9 and 13, the second case 51 comprises a mask 51A covering the periphery of the surface on the front of the second touch panel 52 and the second display 53, and a cover 51B covering the surface on the back of the second touch panel 52 and the second display 53. As shown in FIG. 10, the cover 51B of the second case 51 is provided with a pair of opening portions 14. The second unit 43 comprises a pair of lenses 15 fitted in the opening portions 14, respectively. The opening portions 14 and lenses 15 are provided in the vicinity of a speaker 56 described later. As shown in FIG. 14, the mask 51A comprises a pair of concave portions 57 corresponding to the outer shape of the pair of lenses 15. Each of the concave portions 57 is depressed along the outer shape of the light receiving part 15B of the lens 15, and the light receiving part 15B is fitted in the concave portion 57.

Figure 11:
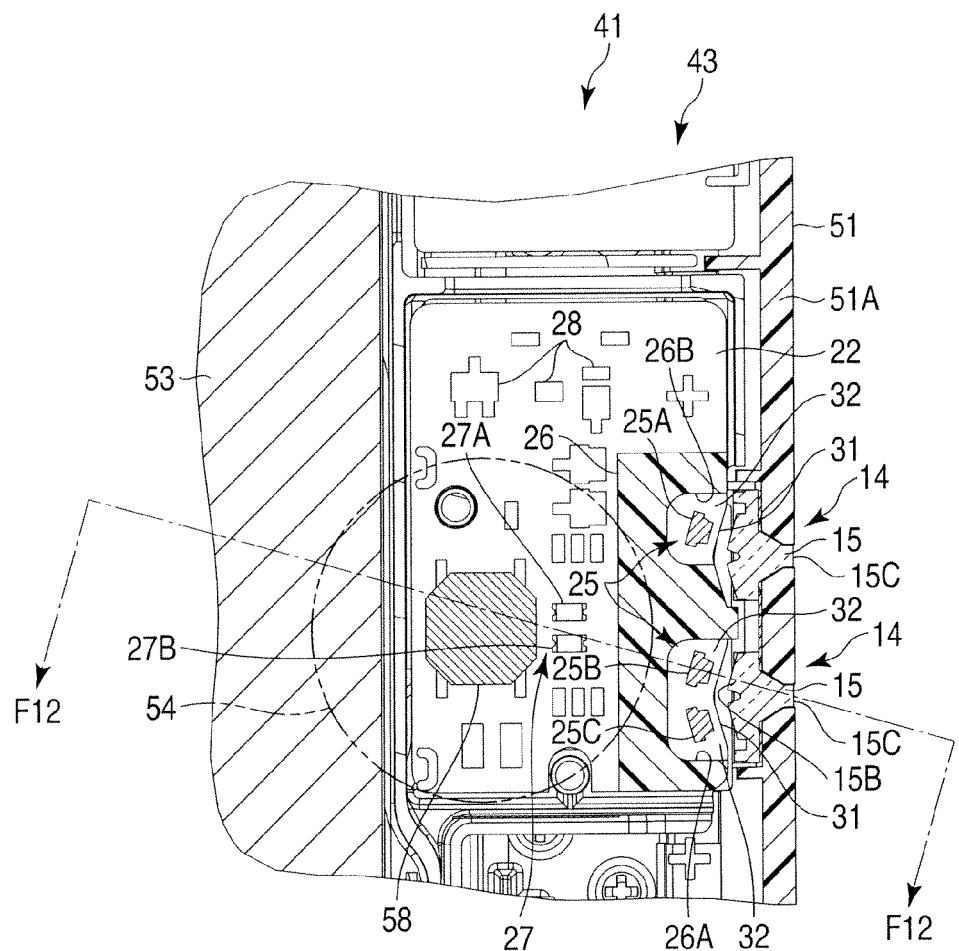
FIG. 11 is an exemplary sectional view of the portable computer shown in FIG. 10, taken along line F11-F11.
Figure 12:
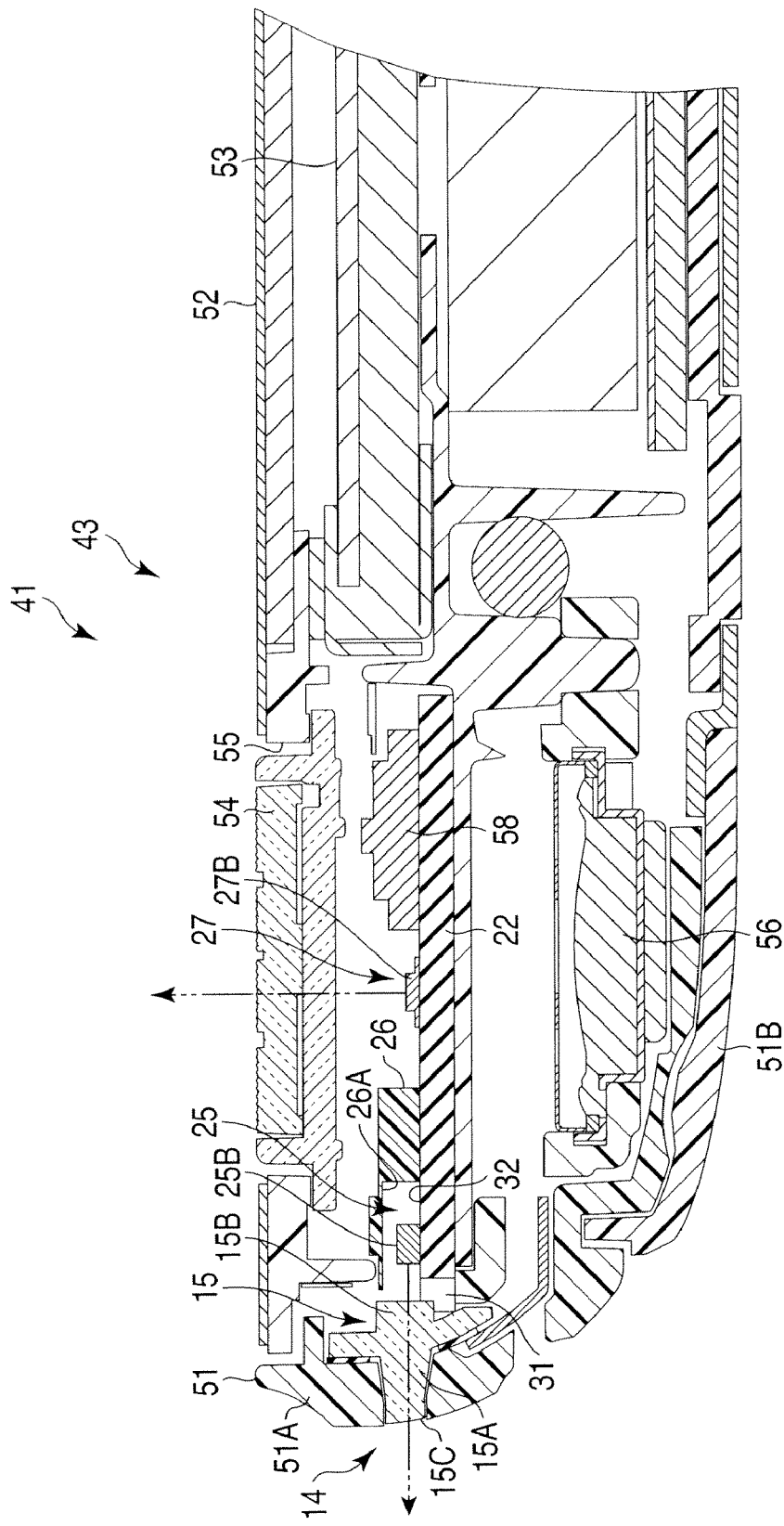
FIG. 12 is an exemplary sectional view of the portable computer shown in FIG. 11, taken along line F12-F12.

As shown in FIGS. 11 and 12, the second unit 43 comprises in the second case 51: a system substrate 21 on which, for example, a CPU is mounted; a printed wiring board 22 electrically connected to the system substrate 21 via, for example, a flexible cable; a plurality of light emitting diodes 25 provided on the printed wiring board 22; a shade 26 surrounding the first light emitting diodes 25; a plurality of second light emitting diodes 27 located on the printed wiring board 22 at positions separated from the first light emitting diodes 25; a switch 58 provided on the printed wiring board 22 and configured to detect depression of the power button 54; and a speaker 56.

As shown in FIG. 11, in addition to the first light emitting diodes 25 and second light emitting diodes 27, a plurality of circuit components 28 are mounted on the printed wiring board 22 at high density. The printed wiring board 22 is provided with an approximately triangular cutout portion 31 formed along the outer shape of light receiving parts 15B of each of the lenses 15, and an edge portion 32 defining the periphery of the cutout portion 31.

The first light emitting diodes 25 are aligned on the edge portion 32 of the printed wiring board 22. In the present embodiment, three first light emitting diodes 25 are provided on the printed wiring board 22, but the number is not limited to three. First light emitting diode 25A of the first light emitting diodes 25, which is the upper one in FIG. 11, emits, for example, orange light while, for example, a wireless LAN is operating, thereby notifying a user of the operation. First light emitting diode 25B of the first light emitting diodes 25, which is the middle one in FIG. 11, emits, for example, orange light while, for example, a contained battery is being charged, thereby notifying the user of the charging operation. First light emitting diode 25C of the first light emitting diodes 25, which is the lower one in FIG. 11, emits, for example, green light while, in a state where charging of the contained battery has been completed (where power remains in the battery), thereby notifying the user of the state.

As shown in FIG. 11, each of the first light emitting diodes 25 is provided on an imaginary straight line connecting the display part 15C and light receiving part 15B of the lens 15, which will be described later. Each of the first light emitting diodes 25 is oriented and opposed to the display part 15C. As shown in FIG. 12, the first light emitting diode 25 is a side-lighting-type light emitting diode, which is configured to emit light parallel to the printed wiring board 22.

As shown in FIGS. 11-13, the shade 26 covers the side surfaces and top surfaces of the first light emitting diodes 25 at positions other than the pair of lenses 15. The shade 26 is provided with a first containing portion 26A depressed to contain two first light emitting diodes 25, and a second containing portion 26B depressed to contain one first light emitting diode 25. The shade 26 separates the first light emitting diodes 25 from the second light emitting diodes 27, and prevents, for example, light emitted from the second light emitting diodes 27 from being applied to the lenses 15 opposed to the first light emitting diodes 25.

As shown in FIG. 11, the second light emitting diodes 27 are located on the printed wiring board 22 away from the edge portion 32, i.e., on an approximately center portion of the printed wiring board 22. The second light emitting diodes 27 are provided in the vicinity of the switch 58. In the present embodiment, two second light emitting diodes 27 are provided on the printed wiring board 22, but the number is not limited to two. As shown in FIG. 12, Each of the second light emitting diodes 27 is an upward-lighting-type diode, and is configured to emit light in a direction crossing (orthogonal to) the direction in which the printed wiring board 22 extends.

As shown in FIG. 11, one of the second light emitting diodes 27 emits light to pass through the power button 54, and can notify the user of the power-on state of the portable computer 41. The other of the second light emitting diodes 27 emits light to pass through the power button 54, and can notify the user that the portable computer 41 is in a suspended (sleep) state. As shown in FIG. 12, the power button 54 has a surface processed to increase surface roughness, and can diffuse light from the second light emitting diodes 27 to the surroundings.

The lens 15 of the present embodiment has the same structure as the lens 15 of the first embodiment shown in FIG. 4. As shown in FIGS. 11 and 12, the light receiving part 15B of the lens 15 is fitted in the cutout portion 31 of the printed wiring board 22. The main part 15A of the lens 15 is fitted in the opening portion 14 of the second case 51.

In the second embodiment, the portable computer 41 comprises: a housing 12 provided with an opening portion 14; a printed wiring board 22 contained in the housing 12; a plurality of first light emitting diodes 25 provided on the printed wiring board 22 and configured to emit light parallel to the printed wiring board 22; a lens 15 comprising a plurality of light receiving parts 15B corresponding to the first light emitting diodes 25, respectively, a display part 15C displaying light which has entered through the light receiving parts 15B, a main part 15A shaped like a truncated cone such that a lower base portion is continuous with the light receiving parts 15B, and an upper base portion is provided with the display part 15C, the main part 15A being fitted in the opening portion 14, each of the first light emitting diodes 25 being provided on an imaginary straight line connecting the display part 15C and a corresponding one of the light receiving parts 15B, and located to emit light to the display part 15C.

With this configuration, even when a sufficient distance between the housing 12 and the first light emitting diodes 25 cannot be secured, sufficient light can be emitted to the display part 15C. Consequently, better viewability of light on the display part 15C and reduction in size of the housing 12 of the portable computer 41 can be realized.

The electronic apparatus is not limited to the television apparatus 11 and portable computer 41 adopted in the above embodiments, and may be another electronic apparatus, such as a mobile phone. In the above embodiments, a clearance between the light receiving part 15B of the lens 15 and the cutout part 15B of the printed wiring board 22 is provided, and only a small portion of the light receiving part 15B is inserted in the cutout portion 31. However, the light receiving part 15B may be located closer to the first light emitting diode 25, and a larger portion of the light receiving part 15B may be inserted in the cutout portion 31.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A television apparatus, comprising:
a housing provided with an opening portion;
a printed wiring board provided with a cutout portion and contained within the housing;
a plurality of first light emitting diodes provided on the printed wiring board and contained within the housing, the plurality of first light emitting diodes being configured to emit light parallel to the printed wiring board; and
a lens comprising (i) a plurality of light receiving parts fitted in the cutout portion and each light receiving part corresponding to a first light emitting diode of the plurality of first light emitting diodes, and (ii) a display part configured to display the light which has entered through the light receiving parts, and (iii) a main part having a truncated cone shape including a lower base portion continuous with the plurality of light receiving parts and an upper base portion provided with the display part, the main part being fitted in the opening portion.

2. The television apparatus of claim 1, wherein
the printed wiring board comprises an edge portion defining a peripheral portion of the cutout portion, and
each of the first light emitting diodes are provided on the edge portion.

3. The television apparatus of claim 2, wherein
each first light emitting diode is provided on an imaginary straight line connecting the display part and a corresponding one of the light receiving parts and is located to emit light to the display part.

4. The television apparatus of claim 3, wherein the lens is substantially symmetrical with respect to a central axis of the main part.

5. The television apparatus of claim 4, comprising a shade provided on the printed wiring board and surrounding the first light emitting diodes at positions other than the lens.

6. The television apparatus of claim 5, comprising a second light emitting diode located on the printed wiring board away from the edge portion and configured to emit light in a direction crossing the printed wiring board.

7. An electronic apparatus, comprising:
a housing provided with an opening portion;
a printed wiring board provided with a cutout portion and contained within the housing;
a plurality of first light emitting diodes provided on the printed wiring board and contained within the housing, the plurality of first light emitting diodes being configured to emit light parallel to the printed wiring board; and a lens comprising (i) a plurality of light receiving parts corresponding to the first light emitting diodes, respectively, and fitted in the cutout portion, (ii) a display part configured to display light which has entered through the light receiving parts, and (iii) a main part having a truncated cone shape including a lower base portion continuous with the plurality of light receiving parts and an upper base portion provided with the display part, the main part being fitted in the opening portion.

8. The electronic apparatus of claim 7, wherein
the printed wiring board comprises an edge portion defining a peripheral portion of the cutout portion, and
each of the first light emitting diodes are provided on the edge portion.

9. The electronic apparatus of claim 8, wherein
each first light emitting diode is provided on an imaginary straight line connecting the display part and a corresponding one of the light receiving parts and is located to emit light to the display part.

10. The electronic apparatus of claim 9, wherein the lens is substantially symmetrical with respect to a central axis of the main part.

11. The electronic apparatus of claim 10, comprising a shade provided on the printed wiring board and surrounding the first light emitting diodes at positions other than the lens.

12. The electronic apparatus of claim 11, comprising a second light emitting diode located on the printed wiring board away from the edge portion and configured to emit light in a direction crossing the printed wiring board.

13. An electronic apparatus, comprising:
a housing provided with an opening portion;
a printed wiring board contained in the housing and provided with a cutout portion;
a plurality of first light emitting diodes provided in a vicinity of the cutout portion of the printed wiring board;
a lens comprising a plurality of light receiving parts located at least in part in the cutout portion of the printed wiring board and corresponding to the first light emitting diodes, respectively, and a guide part configured to guide light from the light receiving parts to the opening portion; and
a speaker provided at a position which overlaps the first light emitting diodes in a thickness direction of the housing.

14. The electronic apparatus of claim 13, wherein the opening portion is provided at a side surface of the housing.

15. An electronic comprising:
a housing provided with an opening portion;
a printed wiring board contained in the housing and provided with a cutout portion;
a plurality of first light emitting diodes provided in a vicinity of the cutout portion of the printed wiring board;
a lens comprising a plurality of light receiving parts located at least in part in the cutout portion of the printed wiring board and corresponding to the first light emitting diodes, respectively, and a guide part configured to guide light from the light receiving parts to the opening portion; and
a button which is allowed to advance and retreat in a direction which crosses the printed wiring board.

* * * * *